United States Patent
Hofmann

(10) Patent No.: US 7,547,040 B2
(45) Date of Patent: Jun. 16, 2009

(54) SIDE IMPACT PROTECTIVE APPARATUS FOR A MOTOR VEHICLE OCCUPANT

(75) Inventor: Peter Hofmann, Neuhausen (DE)

(73) Assignee: Dr. Ing. h.c.F. Porsche Aktiengesellschaft, Weissach (DE)

(*) Notice: Subject to any disclaimer, the term of this patent is extended or adjusted under 35 U.S.C. 154(b) by 319 days.

(21) Appl. No.: 10/770,397

(22) Filed: Feb. 4, 2004

(65) Prior Publication Data

US 2004/0155441 A1 Aug. 12, 2004

(30) Foreign Application Priority Data

Feb. 6, 2003 (DE) ................ 103 04 790

(51) Int. Cl.
*B60R 21/021* (2006.01)
(52) U.S. Cl. .............. 280/730.2; 280/728.2; 280/728.3
(58) Field of Classification Search ............. 280/730.2, 280/728.2, 728.3, 732
See application file for complete search history.

(56) References Cited

U.S. PATENT DOCUMENTS

| | | | |
|---|---|---|---|
| 5,669,627 A * | 9/1997 | Marjanski et al. | 280/728.3 |
| 5,868,421 A * | 2/1999 | Eyrainer | 280/730.2 |
| 5,921,576 A * | 7/1999 | Sinnhuber | 280/730.2 |
| 6,616,175 B2 * | 9/2003 | Hofmann et al. | 280/728.3 |
| 6,682,093 B2 * | 1/2004 | Tajima et al. | 280/732 |
| 6,773,031 B2 * | 8/2004 | Haig | 280/749 |
| 2002/0079677 A1 * | 6/2002 | Skirha et al. | 280/728.3 |

FOREIGN PATENT DOCUMENTS

| EP | 0771699 A2 | 5/1997 |
|---|---|---|
| EP | 1 043 197 A1 | 10/2000 |
| JP | 3-284443 | 12/1991 |
| JP | 8-72658 | 3/1996 |

OTHER PUBLICATIONS

European Search Report dated Mar. 18, 2004.
* cited by examiner

Primary Examiner—John Q. Nguyen
Assistant Examiner—Timothy Wilhelm
(74) Attorney, Agent, or Firm—Laurence A. Greenberg; Werner H. Stemer; Ralph E. Locher

(57) ABSTRACT

A side impact protective apparatus is incorporated into a side wall of a motor vehicle, such as a motor vehicle door, and includes a pressure gas source as well as a gas bag inflatable by the latter. The folded together, extended gas bag is arranged along the upper edge of the side wall behind an internal covering in the resting state. The gas bag exits upward upon unfolding in the region of the railing of the side wall through a slot formed between the upper edge of the covering and the side wall and extends upward along the interior of a side window as impact protection for the head region of the motor vehicle occupant. The covering is fastened on the side wall at a distance to both long-sided ends of the gas bag, and a defined weakening is present on the front face of the covering approximately at the height of the pivotal upper edge region. As a result, a great stability of the covering is attained, and a defined exit is assured over a large temperature range when the gas bag unfolds. Thus, when viewed from the side, an ideal connection line through the two spaced fastenings forms a swiveling axis for the pivotal upper edge region of the covering.

7 Claims, 4 Drawing Sheets

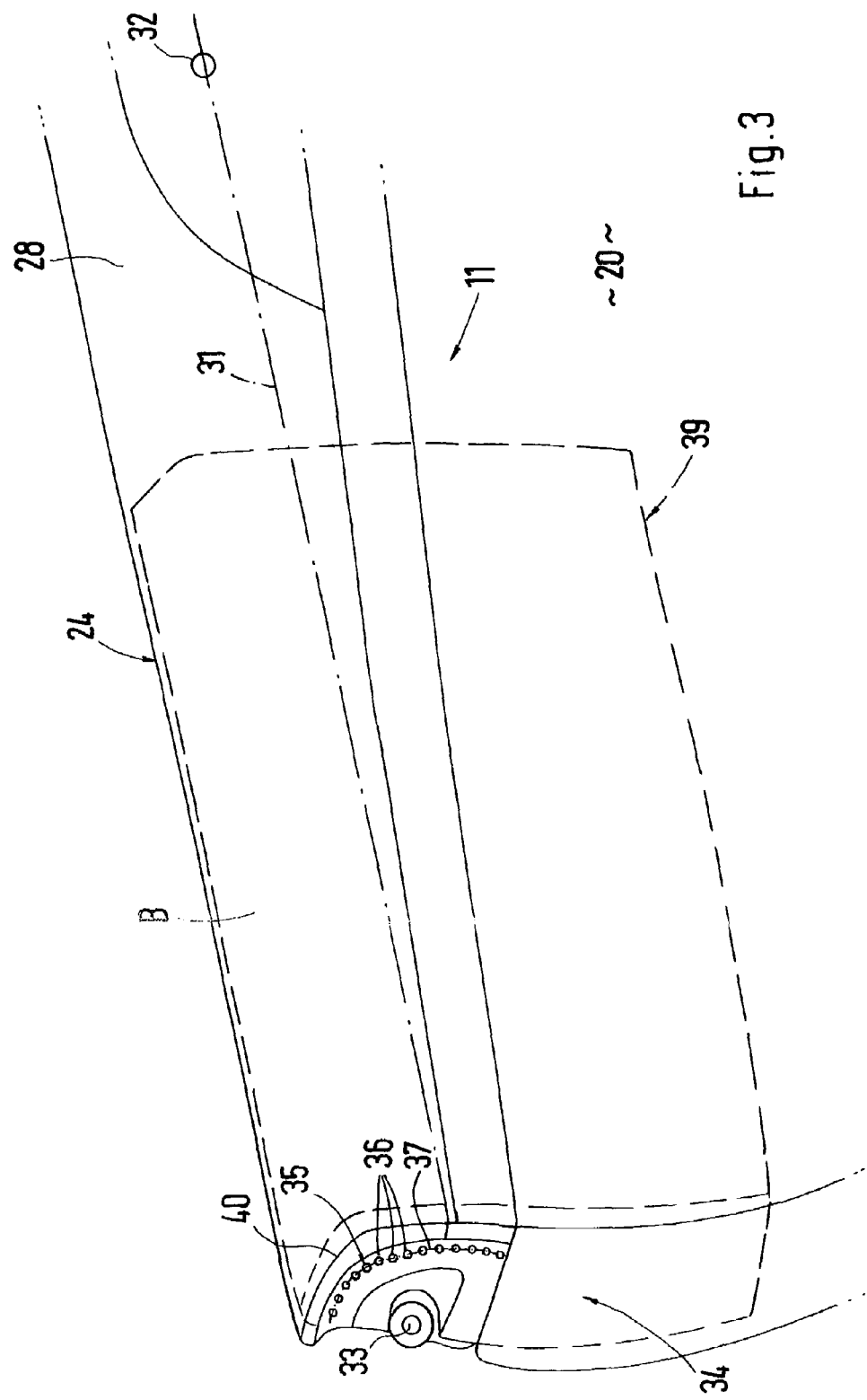

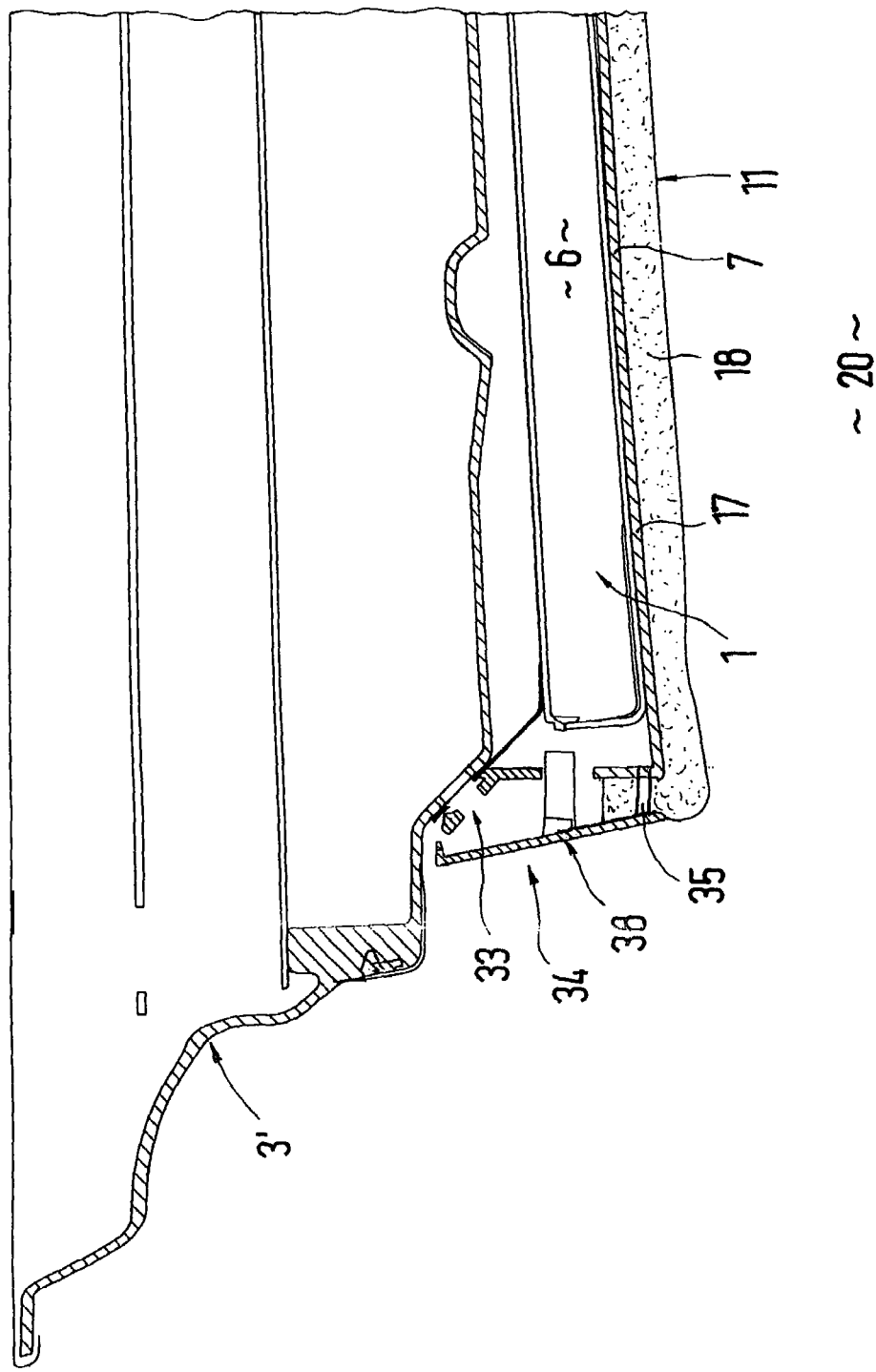

SIDE IMPACT PROTECTIVE APPARATUS FOR A MOTOR VEHICLE OCCUPANT

This application claims the priority of German application 103 04 790.5, filed Feb. 6, 2003, the disclosure of which is expressly incorporated by reference herein.

BACKGROUND AND SUMMARY OF THE INVENTION

The present invention concerns a side impact protective apparatus for a motor vehicle occupant, which is incorporated into a side-wall of a motor vehicle, especially into a motor vehicle door, including a pressure gas source, and a gas bag which can be inflated by the pressure gas source, the gas bag being folded together and arranged in a resting position along an upper edge of the side wall behind an internal covering and exiting upwardly upon unfolding in the region of a railing in the side wall through a slot formed between the upper edge of the covering and the side wall and extending upward along an interior of a side window as impact protection for the head region of the occupant of the motor vehicle.

A known side impact protective apparatus, disclosed in European publication EP 0 771 699 A2, which is of the type mentioned at the beginning, is incorporated into a motor vehicle door and includes a source of pressure gas as well as a gas bag which can be inflated by it. The gasbag is connected to a long-side end region with the pressure gas source, and the other long-side end is connected with the motor vehicle door through a fabric flap. When the gasbag unfolds, the covering of the motor vehicle door is released so that the gasbag exits upward through a slot formed between the upper edge of the covering and the motor vehicle door and extends upward along the interior of the door window as impact protection for the head region of the motor vehicle occupants. An easily detachable connection, for example, a clip connection, is provided in the motor vehicle door window-pane for fastening the covering on the motor vehicle door.

Associated with this arrangement is the disadvantage that the twofold binding of the gasbag to the motor vehicle door is costly and cost-intensive. The configuration of the detachable clip connection is hard to design since the covering must have a certain strength, for example when placing the forearm on the upper side of the covering while driving, while a rapid and secure detaching of the clip connections in the event of an automobile accident must be guaranteed over a relatively large temperature range.

An objective of the invention is to perfect the binding of the upper edge area of a covering on the adjacent side wall, especially motor vehicle doors, in such a way that, on the one hand, a high strength of the covering is attained using simple resources, and in such a way that, on the other hand, a defined exiting of the gas bag during the specified unfolding time between motor vehicle door and covering is guaranteed over a wide temperature range.

This objective is accomplished by way of a covering fastened at a distance to two long-sided ends of the gas bag approximately at the height of a lower edge region of the gas bag on the side wall so that, viewed from the side, an ideal connection line forms a swiveling axis for a pivotal upper region of the covering and at the front side of the covering through two spaced fastenings, with a defined weakening provided approximately at a height of the pivotal upper region. Additional features advantageously refining the invention are claimed.

Primary advantages attained with the invention include that, through a selective fastening of the covering on the motor vehicle door and through a projected weakening on the front face of the covering, a great strength of the covering in normal operation takes place and that a defined swiveling of only the upper edge region of the door covering takes place in the direction of the motor vehicle occupants when the gas bag unfolds.

Advantageously the covering is fastened adjacent to the two long-sided ends of the gas bag on the side wall, especially the motor vehicle door, approximately at the height of the lower edge region of the gas bag, whereby—when viewed from the side—an ideal connection line though the two spaced fastenings forms a pivoting axis for the pivotal upper edge region of the covering. A defined weakening in the covering is provided on the bordering front face of the covering approximately at the height of the side impact protective apparatus. The weakening is created through a tool-dropping notch or through subsequently applied circular bore holes joined with one another or slot-like openings joined with one another. The front face weakening effectively supports the pivoting away of the upper edge region of the covering when the gasbag unfolds. A longitudinally oriented cross section diminution can be provided adjoining the ideal connection line or in a region lying upon it, so that the covering selectively swivels about this region when the gasbag unfolds. Advantageously an encapsulated fabric insert embedded into the carrying element of the covering at least adjoining the side impact protective apparatus is provided. In this way, it is ensured that no undefined tearing of the carrier element occurs when the upper edge region of the covering swivels. The front face fastening screw and the weakening arranged adjoining thereto is covered by a superimposed protective cap.

A design of the invention is depicted in the drawing which is described in greater detail below.

BRIEF DESCRIPTION OF THE DRAWINGS

FIG. 3 illustrates a perspective view obliquely from behind on the upper edge region of the internal covering, and FIG. 4 illustrates an enlarged section as seen along line IV-IV of FIG. 1.

DETAILED DESCRIPTION OF THE INVENTION

Figure 1:
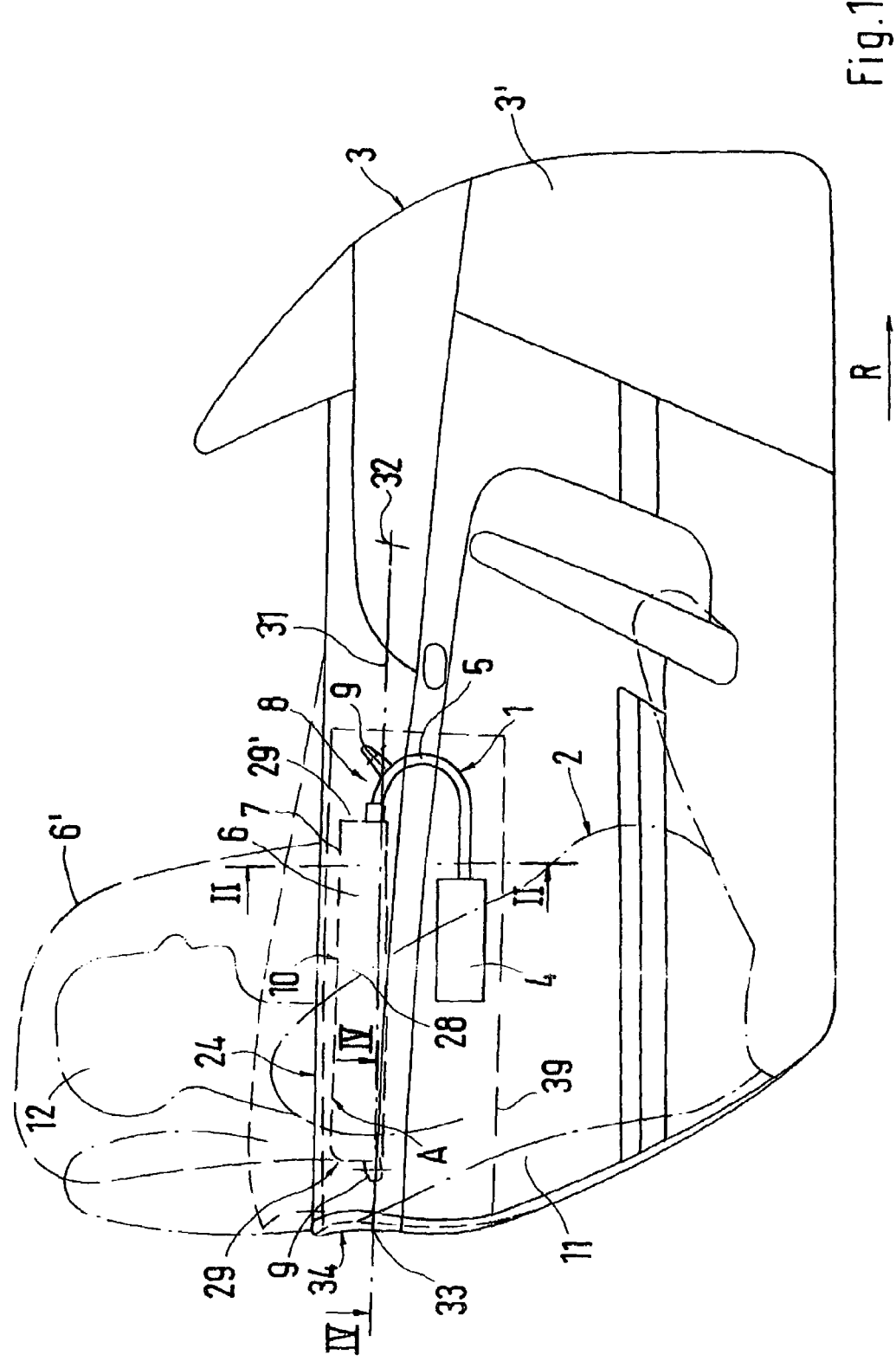
FIG. 1 illustrates a side view from inside against a motor vehicle door with a side impact protective apparatus arranged behind an internal covering.

A side impact protective apparatus 1 for a motor vehicle occupant 2 is incorporated into a side wall 3 of a motor vehicle, especially a motor vehicle door 3', and includes a pressure gas source 4 which stands in operative connection with a gas bag 6 inflatable by the pressure gas source 4 through a bent gas lance 5. The pressure gas source 4 can be any desired gas generator which can furnish the amount of pressure gas required to inflate the gasbag 6 in the amount of time usually available. The folded together, extended gasbag 6 is surrounded by an external casing 7 which tears regionally when the gasbag 6 unfolds.

In accordance with FIG. 1, the gas bag 6, the casing 7, the gas lance 5 and the pressure gas source 4 form a prefabricated air bag module 8, whereby the gas bag 6 with its casing 7 is fastened on the side wall 3, especially on the motor vehicle door 3' by screws 9 or the like. In accordance with FIG. 1, the folded together gas bag 6 and the casing 7 form an extended package which is arranged in the resting state A along the upper longitudinally running edge 10 of the side wall 3 (motor vehicle door 3') behind an internal covering 11. The pressure gas source 4 extends in accordance with FIG. 1 underneath the folded together gasbag 6.

In the design, the side impact protective apparatus 1 is incorporated into the motor vehicle door 3' and the inflated gas bag 6' acts as a head air bag 12 for the motor vehicle occupant 2. The side impact protective apparatus 1 could nevertheless also be allocated to a stationary back seat side element of motor vehicle. The inflated position of the gasbag 6 is represented in dotted lines and provided with the reference number 6' in FIGS. 1 and 2.

Figure 2:
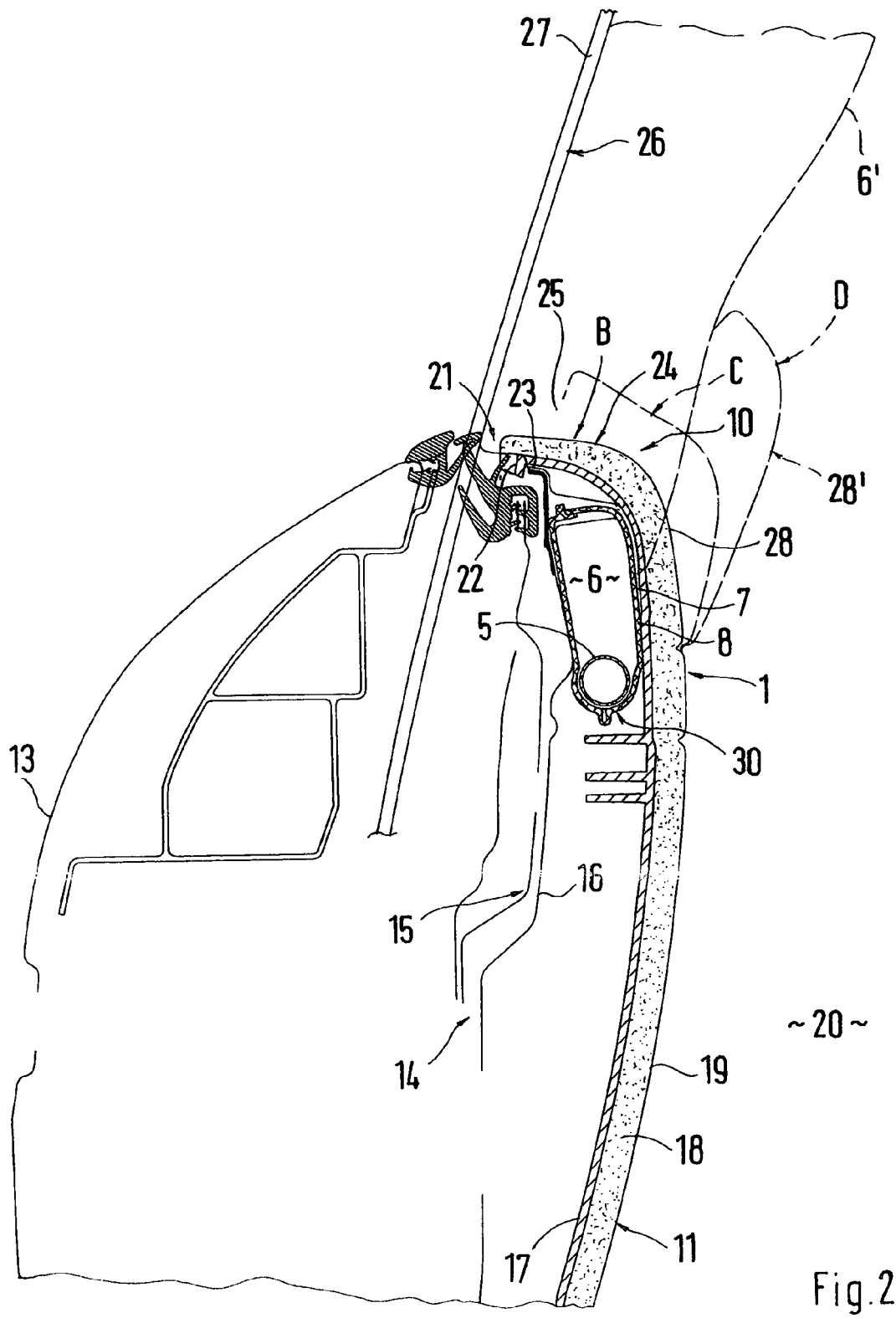
FIG. 2 illustrates an enlarged section as seen along line II-II of FIG. 1.

In accordance with FIG. 2, the motor vehicle door 3' consists of an external sheet 13 which is connected edge-side with a door interior element 14 by flanging, welding or the like. In the design, the door interior 14 is assembled from a circular external frame 15 and a large area internal sheet 16, whereby both components are detachably connected with each other on the peripheral side.

The internal covering 11 includes a carrier element 17 of plastic, a PU foam stratum 18 as well as a decorative layer 19. The decorative layer 19 turned toward the passenger space 20 is formed by a deep drawn foil, a slush skin, a leather or artificial leather layer or the like. The internal covering 11 is suspended with its upper edge 21 on the door interior element 14 and is connected on the peripheral side by a detachable fastening apparatus with the motor vehicle door 3'. The suspension connection is formed by a downward projecting shoulder 22 of the covering 11 which reaches behind (FIG. 2) a flange 23 of the internal sheet 16 toward the motor vehicle exterior. The covering 11 lies regionally on the upper side of the flange 23 with supporting ribs.

When required, the pressure gas source 4 can be triggered by a (not represented) triggering sensor unit so that a certain amount of gas standing under pressure is released. When the gas bag 6 unfolds, this exits in the region of a railing 24 of the side wall 3, especially of the motor vehicle door 3', through a slot 25 formed between the upper edge of the covering 11 and the side wall 3 and extends upward along an interior 26 of a side window 27 in the direction of the roof and then forms an impact protection for the head region of the motor vehicle occupant 2 resting on the motor vehicle seat. A defined swiveling of an upper edge region 28 of the covering 11 is attained when the gas bag 6 unfolds in that the covering 11 is fastened at a distance to the two long-sided ends 29, 29' of the gas bag 6 on the side wall 3, that is on the motor vehicle door 3' in the design, and to be sure about at the height of a lower edge region 30 of the folded together gas bag 6.

An ideal connection line 31 (viewed from the side) through the two spaced fastenings 32, 33 of the covering 11 forms as it were a swiveling axis (hinge line) for the pivotal upper edge region 28 of the covering 11. To support the swiveling motion in the direction of the passenger space 20, a defined weakening 35 is provided on the front face 34 of the covering 11, approximately at the height of the side impact protective apparatus 1. Adjoining the ideal connection line 31 or somewhat above it, an extended cross section diminution can be formed on the covering 11 to support the swiveling motion (not represented in greater detail). Viewed in the direction of travel R, the frontally positioned attachment 32 of the covering 11 is provided adjoining an internally positioned door opener of the motor vehicle door 3' in the design. Viewed in the direction of travel, the rear positioned attachment 33 of the covering 11 is located at the cross front face 34 of the motor vehicle door 3. The front face weakening 35 runs parallel to the external contour 40 of the covering turned toward the passenger space 20. According to FIG. 3, the weakening is within a short distance of the outer contour 40 of the covering 11. In accordance with FIG. 3, the weakening 35 is formed by several bore holes 36 arranged at a short distance from one another in accordance with FIG. 3, whereby the centers of the bore holes 36 lie on a common arch-like middle line 37. A narrow connection bar extends respectively between two adjacent bore holes 36. In the design, the lower end of the weakening 35 lies slightly lower than the ideal connection line 31.

Furthermore, the weakening 35 can be formed by several longitudinal slit-like openings joined with one another (not represented in greater detail). The bore holes 36 or the slit-like openings are subsequently created after manufacture of the covering 11 by drilling, milling, stamping or the like on the covering 11. Even penetrating V-shaped or semicircular tool-falling indentations on the carrier element 17 of the covering 11 can form the front face weakening 35. The front face fastening 33 and the weakening 35 are covered by a superimposed protective cap 38. The protective cap 38 is fastened by a clip or latching connection on the covering 11. The carrier element 17 of the covering 11 manufactured of a suitable plastic in the injection molding process includes at least adjoining the side impact protective apparatus 1 an embedded net-like fabric insert 39. The outlines of the fabric insert 39 are represented in dotted lines in FIGS. 1 and 3. Instead of the embedded fabric insert 39, a superimposed thin-walled sheet reinforcement can also be provided.

In the resting position of the side impact protective apparatus 1, the upper edge region 28 of the covering 11 assumes position B (FIG. 2).

In a crash-conditioned activation of the side impact protective apparatus 1, the gasbag 6 is inflated by the pressure gas source 4. After tearing the casing 7, the gasbag 6 lifts the covering 11 upward so that the upper edge-side suspension connection is released. Thereafter the covering element 11 tears on the front face side in the region of the weakening 35 and the upper edge region 28 swivels when the gas bag exits through intermediate positions, for example C, into the end position. When the upper edge region 28 swivels from position B to the end position D, the shape characteristics of the upper edge region 28 (viewed in cross section) change. That is, the edge region 28 is stretched (FIG. 2).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A side impact protective apparatus for a motor vehicle occupant that is incorporated into a door of a motor vehicle that includes an external sheet and a door interior element, said apparatus comprising:
   a pressure gas source,
   a one-piece covering (11) including a downward projecting shoulder (22) at its upper edge that reaches behind a part of said door interior element to suspend the covering from said door interior element, and
   a gas bag (6) having respective longitudinal ends which can be inflated by the pressure gas source, the gas bag being folded together and arranged in a resting position behind the covering, and, when inflated by the pressure gas source, releasing the downward projecting shoulder and exiting upwardly in a region of a side wall railing through a slot formed between the upper edge of the covering and a side window, thereby extending upward along an interior of the side window as impact protection for a head region of the occupant, wherein the covering is connected on opposed peripheral sides of the covering with the door of the motor vehicle by two detachable spaced fastenings (32, 33) and wherein an ideal connection line (31) is defined on the one-piece covering through the two detachable spaced fastenings such that a swiveling axis is formed by the ideal connection line for pivoting an upper edge region (28) of the one-piece covering on the ideal connection line, and wherein a cross front face (34) of the covering includes a weakening (35) defined therein, wherein the cross front face extends substantially perpendicular to a face of the covering that faces a passenger space (20) of the motor vehicle and wherein the weakening runs parallel to an external contour (40) of the covering turned towards the passenger space, and wherein the one-piece covering is tearable in a region of the weakening when the upper edge region (28) of the one-piece covering pivots.

2. The side impact protective apparatus according to claim 1, wherein one of the spaced fastenings, viewed in a direction of travel, is a frontally positioned fastening of the covering which adjoins an internally positioned door opener of the motor vehicle door.

3. The side impact protective apparatus according to claim 1, wherein one of the spaced fastenings, viewed in a direction of travel, is a rear-positioned fastening of the covering which is arranged adjoining the weakening.

4. The side impact protective apparatus according to claim 1, wherein the weakening is formed by bore holes.

5. The side impact protective apparatus according to claim 1, wherein the weakening is formed by slit-like openings.

6. The side impact protective apparatus according to claim 3, wherein the rear-positioned fastening and the weakening are covered by a superimposed protective cap.

7. The side impact protective apparatus according to claim 1, wherein an embedded net-like fabric insert is provided inside a carrier element of the covering at least adjoining the side impact protective apparatus.

* * * * *